United States Patent
Rembault

[11] 4,025,731
[45] May 24, 1977

[54] OPTICAL RECORD, AND ASSOCIATED RECORDING AND READING-OUT DEVICES

[75] Inventor: Michel Rembault, Paris, France

[73] Assignee: Thomson-CSF, Paris, France

[22] Filed: July 3, 1974

[21] Appl. No.: 485,714

Related U.S. Application Data

[63] Continuation of Ser. No. 245,431, April 19, 1972, abandoned.

[30] Foreign Application Priority Data

Apr. 20, 1971  France .................................. 71.13917

[52] U.S. Cl. .................. 179/100.4 R; 179/100.3 G; 179/100.3 V; 350/3.5
[51] Int. Cl.² ........................................... G11B 7/18
[58] Field of Search ............. 179/100.3 G; 350/3.5; 340/173 LM; 346/108; 178/6.7 R, 6.7 A, 6.6 R, 6.6 DD; 274/41 A, 41.6

[56] References Cited

UNITED STATES PATENTS

| | | | |
|---|---|---|---|
| 2,283,545 | 5/1942 | Eckert | 179/100.3 G |
| 3,147,062 | 9/1964 | Glenn, Jr. | 178/6.6 TP |
| 3,281,798 | 10/1966 | Glenn, Jr. | 178/6.6 TP |
| 3,328,776 | 6/1967 | Hughes et al. | 178/6.6 TP |
| 3,453,640 | 7/1969 | Blackmer | 179/100.3 G |
| 3,545,834 | 12/1970 | Gerritsen | 179/100.3 G |
| 3,572,882 | 3/1971 | Neuman | 350/3.5 |
| 3,627,916 | 12/1971 | Bestenreiner | 179/100.3 G |
| 3,703,724 | 11/1972 | Thomas et al. | 346/108 |
| 3,746,783 | 7/1973 | Gerritsen et al. | 178/6.7 A |
| 3,758,187 | 9/1973 | Thomas | 350/3.5 |
| 3,770,886 | 11/1973 | Kiemle | 178/6.7 A |
| 3,865,996 | 2/1975 | Kato | 179/100.3 G |

OTHER PUBLICATIONS

Collie, An Up-to-Date Look at Holography, Bell Labs Record, 4/67, pp. 103-109.
Arm et al., Holographic Storage of Electric Signals, Applied Optics, vol. 8, No. 7, 7/69, pp. 1413-1419.
Blackmer et al., Some Aspects of Multiple Beam Interference Techniques in Digital Recording, Applied Optics, vol. 9, No. 12, pp. 2753-2761, 12/70.

*Primary Examiner*—Raymond F. Cardillo
*Attorney, Agent, or Firm*—Cushman, Darby & Cushman

[57] ABSTRACT

The present invention relates to an optical record which can contain in one and the same track, the transcription of several simultaneous signals and is designed to be read out by means of a light source; the track carried by this record is formed by fringes whose spacing varies as a function of the instantaneous amplitude of the signal being transcribed; the invention likewise describes two devices for effecting said record and a read-out device as well.

The invention is applicable in particular to stereographic sound recording.

15 Claims, 15 Drawing Figures

OPTICAL RECORD, AND ASSOCIATED RECORDING AND READING-OUT DEVICES

This application is a continuation of my copending application, Ser. No. 245,431, filed Apr. 19, 1972, which was abandoned upon the filing hereof.

The present invention relates to a record designed to be read out by an optical method and making it possible to transcribe on a single track several simultaneous signals, in particular acoustic signals; it relates more particularly to devices for effecting and reading out this record, which devices use a holographic method.

The drawbacks of conventional optical recordings are well known: Among these drawbacks, it should be noted: the limited dynamic range of the photosensitive substrates, the width of the track required for variable track width techniques, and, above all, in all cases, the difficulty and cost of copying these recordings.

The holographic method, which makes it possible to obtain copies by a die-pressing operation, very much simplifies the problem of the reproduction of records. In constrast to conventional holographic records, the record proposed in accordance with the present invention requires, at read-out, neither strict positioning nor coherency on the part of the light source. At the time of recording, it makes it possible both to carry out real-time operation, to disregard any question of the dynamic range of the substrate or data-carrier; and to have small track widths; last but not least, several simultaneous signals, for example two signals corresponding to a stereographic sound recording, can be recorded on one and the same track.

According to the present invention, there is provided: a record readable by means of a light source and storing on a data carrier $p$ signals within a single track of constant width, $p$ being an integer at least equal to unity;

said signals exhibiting variations in instantaneous amplitude;

said data carrier having a non-uniform optical characteristic, said characteristic defining within said track continuous fringes, said fringes being directed along the axis of said track and forming $p$ superimposed sets;

each said set of fringes being respectively associated with each said signal and obeying a destinctve law of spacing along a direction perpendicular to the axes of said track, said law being variable along said axis and transcribing in said track said instantaneous amplitude;

each of said sets of fringes being capable, upon illumination of said track through the medium of a monochromatic beam of radiant energy, of reconstructing a diffracted spherical wave having a phase centre; said phase centre describing a straight line under the displacement of said track; the position of said phase centre along said straight line being representative of said instantaneous amplitude of said signal.

For a better understanding of the invention, and to show how the same may be carried into effect, reference will be made to the ensuing description and the attached figures, among which:

FIG. 1($a$)–1($C$) are diagrams explaining the principle of the invention;

FIGS. 2($a$)–2($b$) illustrate the record in accordance with the invention;

Figure 1A:
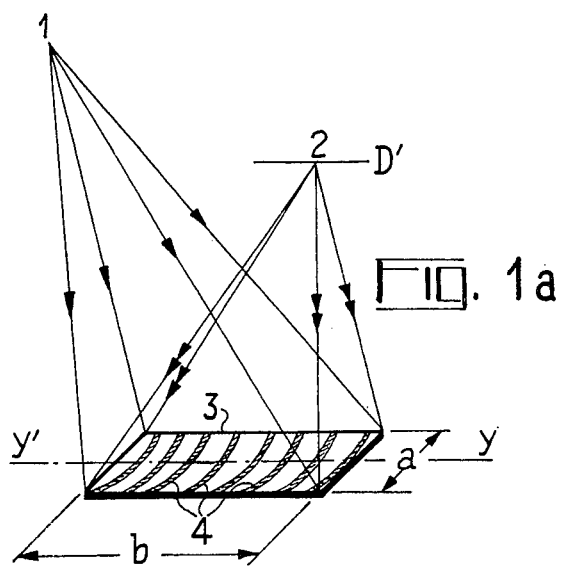

FIG. 1 demonstrates the principle of the invention.

In FIG. 1$a$, two spherical waves have been shown which are emitted by two point sources 1 and 2 of coherent light, obtained from one and the same laser beam; a photographic plate 3 arranged in the region of interference between the two waves, makes it possible to record the pattern of interference fringes or hologram 4. After processing, the plate exhibits a series of fringes alternatively transparent and opaque; it will be appreciated that the conditions to recording are such that there is a linear relationship between the luminous intensity of the interference fringes thus recorded, and the light amplitude transmitted by the negative obtained after processing.

FIG. 1$b$ and 1$c$ illustrate the phenomena which occur when this kind of negative, constituting a diffraction grating is illuminated by a monochromatic spherical wave known as the reference wave, the phase centre of which is at the point 10; in addition to the direct beam, the recorded pattern diffracts two beams constituted by two spherical waves centred at the points 11 and 12 which are called the images of the point 10. In the configuration of 1$b$, where the reference wave issues from the point 10, the phase centres 11 and 12 are virtual points from which the two refracted waves appear to emanate; in the configuration of FIG. 1$c$, where the reference wave converges at the point 10, the two diffracted beams respectively converge at the points 11 and 12 which are thus the real images of the point 10.

If, at the time of recording, the linear relationship condition hereinbefore referred to has not been complied with, then in addition to the image points 11 and 12 corresponding to the first order diffraction by the grating, a series of image points 13, 14 etc. will be observed corresponding to higher orders of diffraction.

If the position, in relation to the recorded hologram 4, of the phase centre 10 of the reference beam is coincidental with that of one of the sources which has been used for recording, the source 1 for example, the phase centre of one of the diffracted waves of first order, 11 for example, will reconstitute the position of the other recording source 2. If the reference source 10 is displaced in relation to the hologram 4, the assembly of image points 11, 12 . . . will displace likewise; the same applies if the hologram 4 is displaced whilst keeping the source 10 fixed. A particularly significant case is encountered if, at recording, the phase centres 1 and 2 are located in one and the same plane parallel to the plane of the substrate 3; the fringe pattern thus recorded is known as a Fourier hologram. Amongst other interestng properties exhibited by this kind of hologram, it can be shown that in this case, whatever the position of the phase centre 10 of the reference wave, the image phase centres, 11, 12 . . . will remain located in the plane passing through 10 and parallel to the plane of the hologram 4; it can also be shown that translation of the Fourier hologram in its own plane, leaves the image phase centres 11, 12, etc. in the same position.

In FIG. 1, the surface of the hologram has been limited to a rectangular surface with sides $a$ and $b$. If the hologram 4 is illuminated by the reference beam centred at 10, the image phase centres 11, 12, 13 . . . will be better defined the larger the number and size of the recorded fringes, thus the larger $a$ and $b$ are. If one of these dimensions is reduced, $a$ for instance, the sharpness of the image points in the direction of the edges $a$ will reduce and the various image points will take the form of lines parallel to this direction.

The arrangement of fringes constituting the hologram 4 shown in FIG. 1$a$, is characteristic of the position of the sources 1 and 2. With the source 1 fixed, if the source 2 describes a straight line D' parallel to the plane of the hologram and contained in a plane perpendicular to said hologram which passes through the source 1, the fringes of the successive holograms thus recorded will be the closer the further the source 2 moves away from the source 1.

Conversely, if, in the device shown in FIG. 1$b$ or 1$c$, the phase centre 10 is maintained in a fixed position by successively introducing into the reference beam the holograms thus recorded, the image centres 11, 12, . . . will displace along straight image lines $D_{11}$, $D_{12}$, . . . parallel to the plane of the hologram.

The invention, both as concerns the record as an entity, and its process of recording and read-out, exploits this property. The instantaneous amplitude of the signal to be recorded will be translated into a corresponding displacement of a moving source such as the source 2, of FIG. 1$a$, along a straight line such as the straight line D' on the same FIG. 1$a$. The record will carry along a track a succession of holograms 4, each hologram corresponding to a position of the source 2 and the greater or lesser spacing of the fringes in each hologram transcribing the position of the source on the straight line. In order to read out this record, this succession of holograms will be illuminated by a fixed reference beam and will produce diffracted waves whose propagation directions will vary in accordance will the spacing of the fringes which go to make up each hologram; the phase centres of these waves will displace along straight lines such as those $D_{11}$, $D_{12}$, . . . of FIG. 1$b$ or 1$c$, with displacements proportional to the displacement of the moving recording source, and thus proportional to the instantaneous amplitude of the signal to be recorded; finally, an optical device will convert this displacement into proportional variations in an electrical quantity.

Figure 2A:
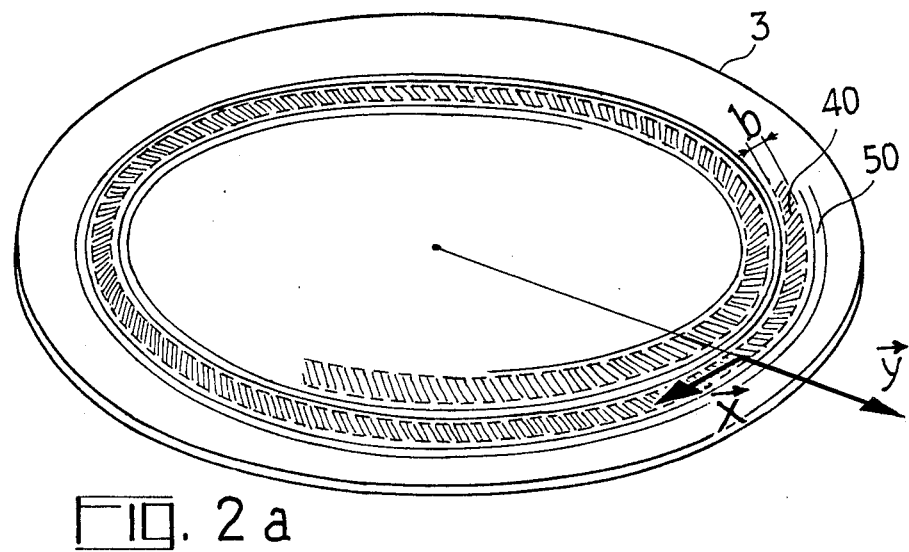
Figure 2B:
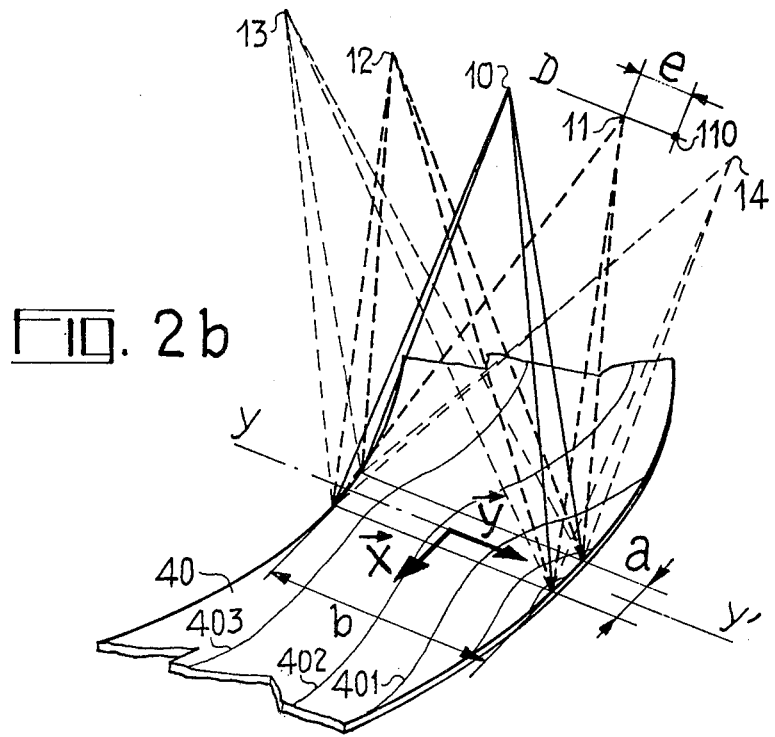

FIG. 2 illustrates the recording in accordance with the invention, which is designed to be read out by means of a light source.

In FIG. 2$a$, a flat data-carrier 3 has been illustrated; by way of a non-limitative example, we will assume that the information is recorded on the carrier in the form of variations in the transparency thereof; still by way of non-limitative example, said carrier 3 has been illustrated in the form of a disc which can be rotated about its own centre.

The recording of the signal occurs in the form of a track 40 of uniform width $b$ describing a constant-pitch spiral on the disc. A spiral track 50 of the same pitch, containing another piece of information for recording, can be arranged parallel to the first, the track 50 being for example the optical recording of a sequence of images of image holograms, and the track 40 the corresponding sound recording. A displacement along the translation axis $\vec{X}$ of the track, represents the time variable, the instantaneous intensity of the signal to be recorded, being coded in the direction $\vec{Y}$ perpendicular thereto.

FIG. 2$b$ enables us to understand how this coding is effected in the track 40. In the direction $\vec{Y}$, perpendicular to the translation direction $\vec{X}$ of the track, the transparency of the data carrier (or in a general manner, the variable optical characteristic chosen to transscribe the date on the carrier) undergoes a succession of maxima of equal value, which produce along the track a series of variably spaced fringes 400, 401, 402, . . .

For each section YY' of the track, YY' being parallel to the direction $\vec{Y}$, the law of distribution of the intervals between successive maxima, will be chosen so that:

on the one hand, the elementary diffraction grating 4, of axis YY' and of side lengths $a$ and $b$ (where $a$ is much smaller than $b$) constituted by the small length of track $a$, furnishes from a quasi-monochromatic spherical wave known as the reference wave, centred at the fixed point 10, a diffracted wave centred at a point 11, said point being located on a straight line D parallel to $\vec{Y}$ and belonging to the plane defined by the point 11 and the axis YY';

and on the other hand, to each position of the section YY' in the track and therefore to each instant of displacement, there corresponds a position of the point 11, which thus oscillates about a rest position 110 with a displacement $e$ proportional to the instantaneous amplitude of the signal.

FIG. 1 enables us to understand the law governing the distribution of the intervals between successive transmission maxima along the direction YY'; in order to obtain the above-described signal coding. It will be observed, in other words, that the arrangement of the transparency maxima in the elementary diffractive network hereinbefore described, is none other than that of the network of fringes recorded by the method shown in FIG. 1$a$, where the width $a$ of the rectangle delimiting the region of interference between the two beams has been reduced to a very small value in relation to the length $b$, and where the source 2 describes a portion of the straight line D'; said straight line D', belonging to the plane passing through the fixed source 1 and the axis YY' of the rectangle and located parallel to said axis.

Following up a remark made earlier on in relation to FIG. 1$b$ or 1$c$, it will be observed that if the diffractive grating is illuminated by a reference source 10, the position of the image is purely a function of the distribution of the intervals between fringes, irrespective of the law of variation in transmission between successive maxima. To the extent that this law of variation respects the linear relationship hereinbefore described, the reference wave centred at 10 will give rise solely to the two diffracted beams of first order, centred at 11 and 12; failing this, there will additionally appear the diffracted beams of higher order centered at 13, 14, . . . etc. However, in all cases, the displacement of the points 11, 12, 13 ... will remain proportional to the instantaneous amplitude of the signal and the intensities of the different beams will remain constant and independent of the position of said points.

This property of the coding method is particularly important in so far as it substantially simplifies the problem of copying records; it is merely necessary, in other words, in order to faithfully reproduce the signal, to accurately transcribe the position of the fringes without it being necessary to take account of the accuracy with which the dynamic range of the photosensitive material enables the variations in contrast between fringes to be copied.

A second particularly significant property of the recording technique in accordance with the invention is that it enables the recording of several independent signals on one and the same track. If, in other words, there are superimposed upon said same track several systems of fringes identical to the system of fringes 401, 402, 403, etc. hereinabefore described, one and the same spherical reference wave centred at a fixed point 10 will produce not only a single set of diffracted spherical waves such as those centred at the points 11, 12, 13, 14, etc., but as many sets as there are superimposed systems of fringes. The corresponding phase centres, such as 11, will each describe a different straight line D with a displacement $e$ characteristic of the system of fringes responsible for the diffraction.

Figure 1C:
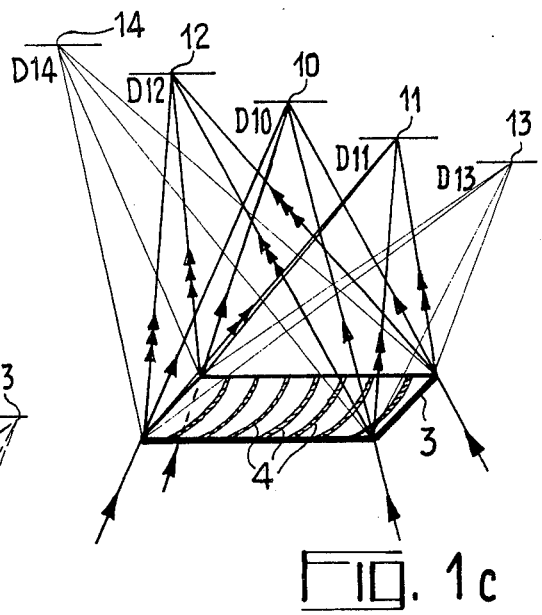
Figure 1B:
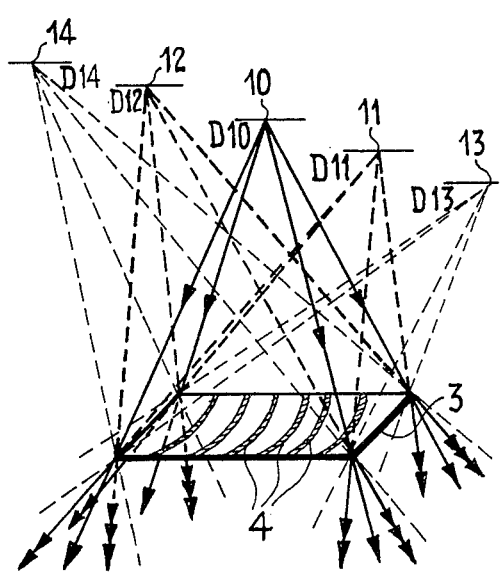

From a consideration of FIG. 1a, it will be observed that this superimposition of several systems of fringes in no way differs from the result which would be obtained by carrying out the dynamic recording of the hologram produced by a spherical wave of fixed phase centre 1, interfering with several spherical waves. The respective phase centres of said spherical waves having an independent motion along separate straight lines, one of which lines being the line D.

By way of a non-limitative application, this property could be exploited to enable the recording upon a single track, not only of a stereophonic sound signal but also, if required, a supplementary optical signal enabling the optical read-out head to be guided.

Figure 5:
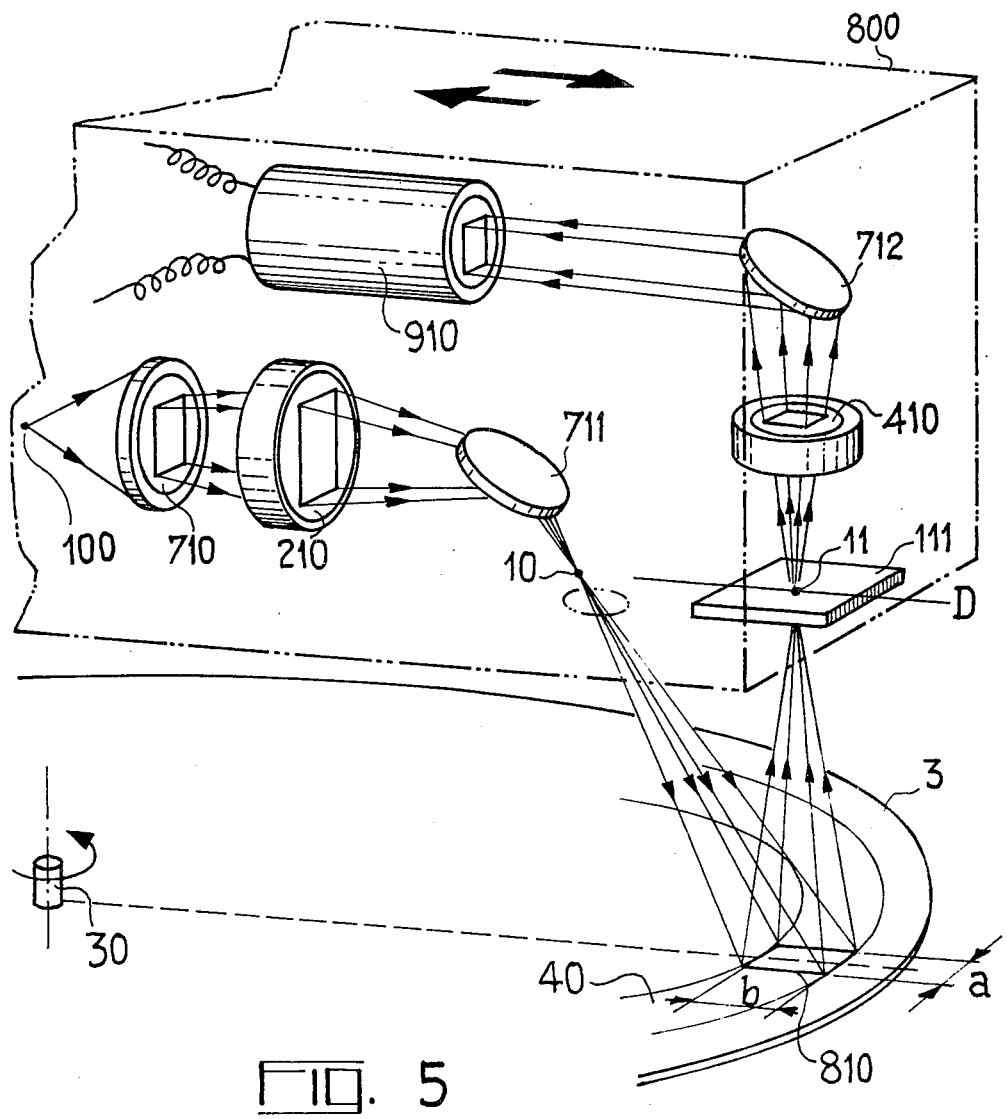
FIG. 5 illustrates an optical device in accordance with the invention, enabling the record to be read out.

A particularly interesting case of the recording technique in accordance with the invention is that where the spacing of the recorded fringes corresponds to that of a Fourier hologram; the phase centres 11, 12, 13, . . . of the diffracted waves are then located in one and the same plane parallel to the carrier 3 and containing the phase centre 10 of the reference wave. The elementary diffraction grating 4 can then be translated in its own plane 3 and in particular in the direction YY', without affecting the positions of the phase centres 11, 12, 13, . . . of the diffracted waves. On the other hand, if the grating 4 is translated perpendicularly to its own plane, the plane containing the phase centres then remains unchanged; it can be shown moreover that, if said translation of the grating is small: 1) when the mean directions of the diffracted beams are perpendicular to the Y direction, the phase centers of these diffracted beams move perpendicularly to the Y direction; and ii) when the mean direction of one of the diffracted beams is perpendicular to the grating (i.e., simultaneously perpendicular to X and Y directions), the phase center of this particular diffracted beam remains unchanged by said translation. The significance of these special arrangements will be better understood when FIG. 5 is described, this figure being devoted to the read-out device.

When the information is transcribed on the carrier in the form of variations in transparency of the latter, the transmitted light wave is amplitude-modulated; the reproduction of the recording thus created employs conventional methods of photographic reproduction of holograms.

Diffraction phenomena identical in all points with those hereinbefore described, can be obtained if the diffractive grating modulates the phase and not the amplitude, of the transmitted wave. The information will then be transcribed on the carrier in the form of variation of its refractive index or its thickness.

Figure 6:
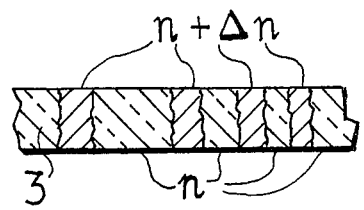
FIGS. 6–12 show various forms of records.
Figure 7:
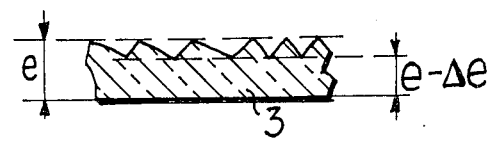

FIG. 6 illustrates a section through the record in accordance wtih the invention, in which the carrier 3 is made of a transparent material whose refractive index varies between $n$ and $n + \Delta n$. Reproduction is likewise effected by a photographic method. FIG. 7 illustrates a section through a record still in accordance with the invention, in which the carrier 3 utilises a transparent material having a flat face, the information on the other face being recorded in the form of relief variations, the thickness of said carrier thus varying between $e$ and $e + \Delta e$. This kind of recording has the major advantage that the original can be copied by a simple die-pressing operation in the manner used for conventional gramophone record, with the additional simplification that there is no need to produce two successive dies because the information is transcribed as well in the form of hollows as in the form of reliefs, without affecting the result.

It is likewise possible to effect the recording in such a manner that it modulates the amplitude or the phase not of a transmitted wave but of a reflected wave. The reference beam and diffracted beams are then located at one end and the same side of the carrier, in contrast to what happens when a transparent carrier is used. The significance of this arrangement is that it enables both faces of the carrier to be successively utilised for the recording of information, thus doubling the storage capacity. FIGS. 8, 9, 10, 11 and 12 illustrate sectional views of the carrier which show different methods in accordance with the invention, for carrying out the recording so that it can be read by reflection.

Figure 8:
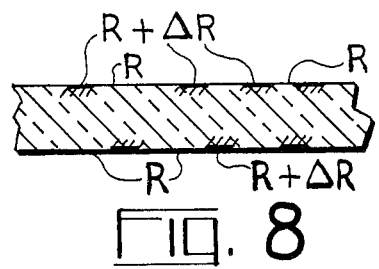

In FIG. 8, the two faces of the carrier 3 are flat and reflective, the reflection coefficient then being variable between the values R and R + $\Delta$R. The reflected wave is then amplitude-modulated.

Figure 9:

In FIG. 9, the two faces of the carrier 3 are reflective and the diffractive gratings transcribing the signal are impressed in the form of relief variations of maximum thickness $\Delta e$. The reflected wave is phase-modulated. The copies of the original can be obtained by die-pressing.

Figure 10:
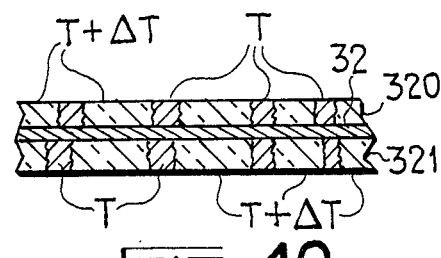

FIG. 10 illustrates a carrier 3 with a flat mirror 32, reflective on both of its faces, on which there have been deposited two layers 320 and 321 of uniform thickness in which the information is transcribed by a variation in transparency, the latter factor varying between T and T + $\Delta$T. The reflected wave is amplitude modulated. The copies of the original can be obtained by a photographic method.

Figure 11:
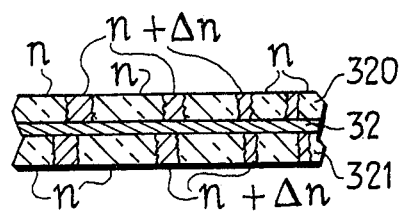

FIG. 11 illustrates a first variant embodiment of the recording described in FIG. 10, where the reflected wave is amplitude-modulated by variations of the refractive index, between $n$ and $n + \Delta n$, of transparent layers 320 and 321 located at either side of the mirror 32. Copies can be obtained photographically.

Figure 12:
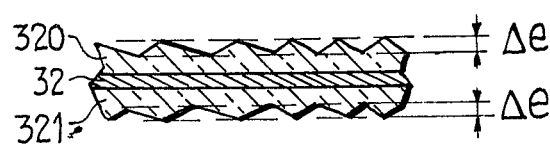

FIG. 12 illustrates a second variant embodiment in which the reflected wave is phase-modulated by the relief variation, of amplitude $\Delta e$, in two transparent layers 320 and 321; copies can be obtained by pressing.

It is well known that the pitch of a diffraction grating operating in the range of visible or near-visible radiation, is in the order of some few microns. A track having a width $b$ of some few tenths of a millimeter will thus contain a sufficient number of fringes to give well-defined images 11, 12, . . . in the direction $\overline{Y}$ perpendicular to the translation axis $\overline{X}$.

Figure 3:
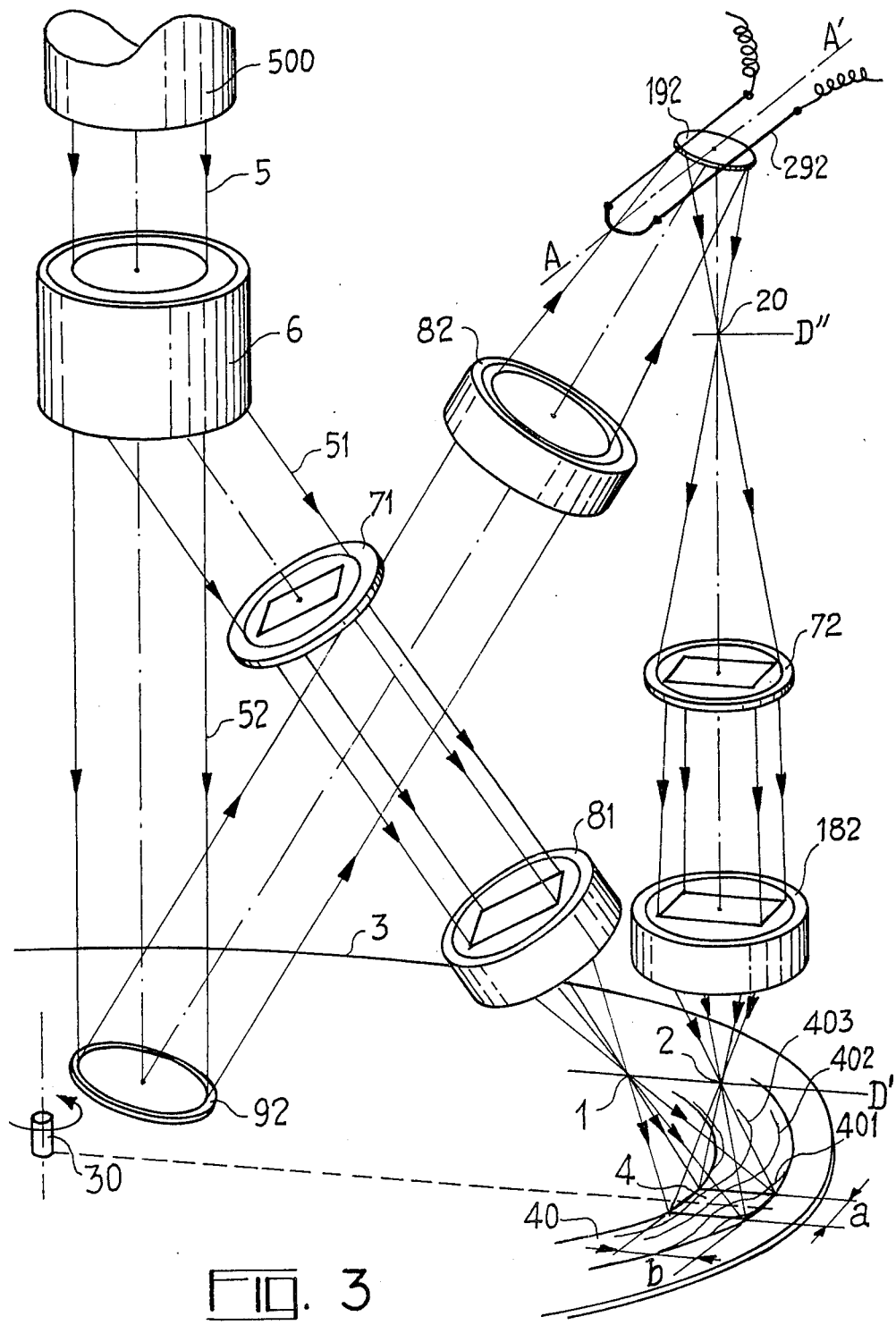
FIG. 3 illustrates a holographic device in accordance with the invention, for carrying out the recording.

FIG. 3 illustrates an optical device in accordance with the invention for transcribing one or more signals on one and the same track of a data carrier, in accordance with aforedescribed recording technique of the invention. This device exploits a holographic technique the principle of which has been described in relation to FIG. 1a.

A parallel beam 5 of coherent light, issuing from a laser source 500, is split by a beam-splitter 6, into two beams 51 and 52 of parallel light.

The beam 51, after passing through the diaphragm 71, is focussed by the lens 81 at a point 1 which thus plays the part of the fixed point coherent light source, namely the phase centre of a spherical wave referred to as the carrier wave, which illuminates the photosensitive material arranged upon the disc 3 which rotates about its axis 30.

The beam 52 after reflection at the flat mirror 92, reaches the lens 82 which transforms it into a convergent beam reflected by the flat vibrating mirror 192; said mirror can oscillate about its axis AA' and its angle of rotation is proportional to the instantaneous amplitude of the signal being recorded; if, for example, this signal is an electrical signal, the mirror 192 could be the vibratory mirror of the two-wired galvano-meter 292. The focus 20 of the convergent beam produced by the lens 82 thus describes a straight line D', its elongation along the line being proportional to the instantaneous amplitude of the signal.

The divergent beam coming from 20, passes through the rectangular diaphragm 72 and reaches the lens 182 which produces a moving image point 2 of the moving point 20, which image point describes the straight line D', the latter being the image of D''; the point 2 thus plays the part of the moving point source which is the centre of a spherical wave known as the object wave, which interferes in the plane of the carrier 3 with the spherical carrier wave coming from the point 1, in order to produce the halogram 4 which is recorded on the moving photosensitive carrier 3.

The optical axes of the lenses 81 and 182 are arranged in such a fashion that they intersect in the plane of the disc 3. The attitude of the mirror 192 is such that the straight line D'' and therefore the straight line D', are parallel to the plane of the disc 3 and perpendicular to the direction of displacement of the carrier. The diaphragms 71 and 72 are located in respective planes of carrier 3 in relation to the objective lenses 81 and 182; their dimensions are such that their respective images are precisely superimposed in the plane of the data-carrier disc in order to form a rectangle delimiting the hologram 4, which rectangle has a side a, parallel to the direction of translation, which is very short compared with the side b. The fringes forming the hologram impress on the moving carrier the fringes 401, 402, 403, . . . which occupy the width b of the track 40; the spacing between said fringes varies in accordance with the position of the source 2 on the straignt line D'.

As can be seen, this holographic method makes it possible to carry out real-time recording of the signal without it being necessary to effect intermediate recording.

In FIG. 3, the position of the lenses 81 and 182 has been shown in such a fashion that the phase centres 1 and 2 of the two spherical waves which enable the hologram 4 to be recorded, are in the same plane parallel to the plane of the disc. The hologram 4 thus obtained is a Fourier hologram whose properties have been described hereinbefore and the advantages of which will be defined hereinafter on the occasion of the description of the read-out method. Nevertheless, the device in accordance with the invention in no way imposes the respective positions of the phase centres 1 and 2 any more than it does the convergence of the wave issuing from the lens 81.

In order to facilitate understanding, only one spherical object wave has been illustrated in FIG. 3, in order to record a single signal. It will be appreciated that there is nothing to prevent one from arranging in parallel, commencing from the coherent beam 5, several optical channels, one of them being identical to said beam which, commencing from the parallel beam 52 and passing via the oscillatory mirror 192, terminates at the moving point source 2, the images of the different diaphragms such as that produced by the lens 182 of the diaphragm 72, all being superimposed on the image which the lens 81 produces on the diaphragm 71; the only restriction on the number of channels is the size of the different lenses. Each oscillatory mirror, similar to oscillating mirror 192, thus being controlled by a different signal, the hologram 4, obtained by interference of the carrier coming from 1 with the various object waves issuing from the moving point sources identical to point source 2 is recorded on the track 40. Several independent signals can thus be simultaneously recorded on the same track.

In the embodiment described hereinbefore, the photosensitive carrier is a disc, which rotates about its centre. The device in accordance with the invention can quite well be designed with any other form of carrier or transport motion, and in particular can employ a carrier in the form of tape or film which has a uniform translatory motion.

Various methods are applicable in the case where it is desired that the fringes constituting the recording shall appear not as variations in transparency of the carrier but as variations in relief so that ultimately copies can be produced by a pressing operation. The photosensitive material can then be a resin of the photoresist type, an appropriate chemical treatment of which makes it possible to dissolve a superficial layer of greater of lesser thickness (depending upon the resin type) the greater the exposure. Equally well known is a conventional photosensitive emulsion of a silver salt in gelatine, which, after developing and in proportion to the light energy received, not only exhibits variations in transparency but variations in relief which can be accentuated by the technique known as "bleaching".

Figure 4:
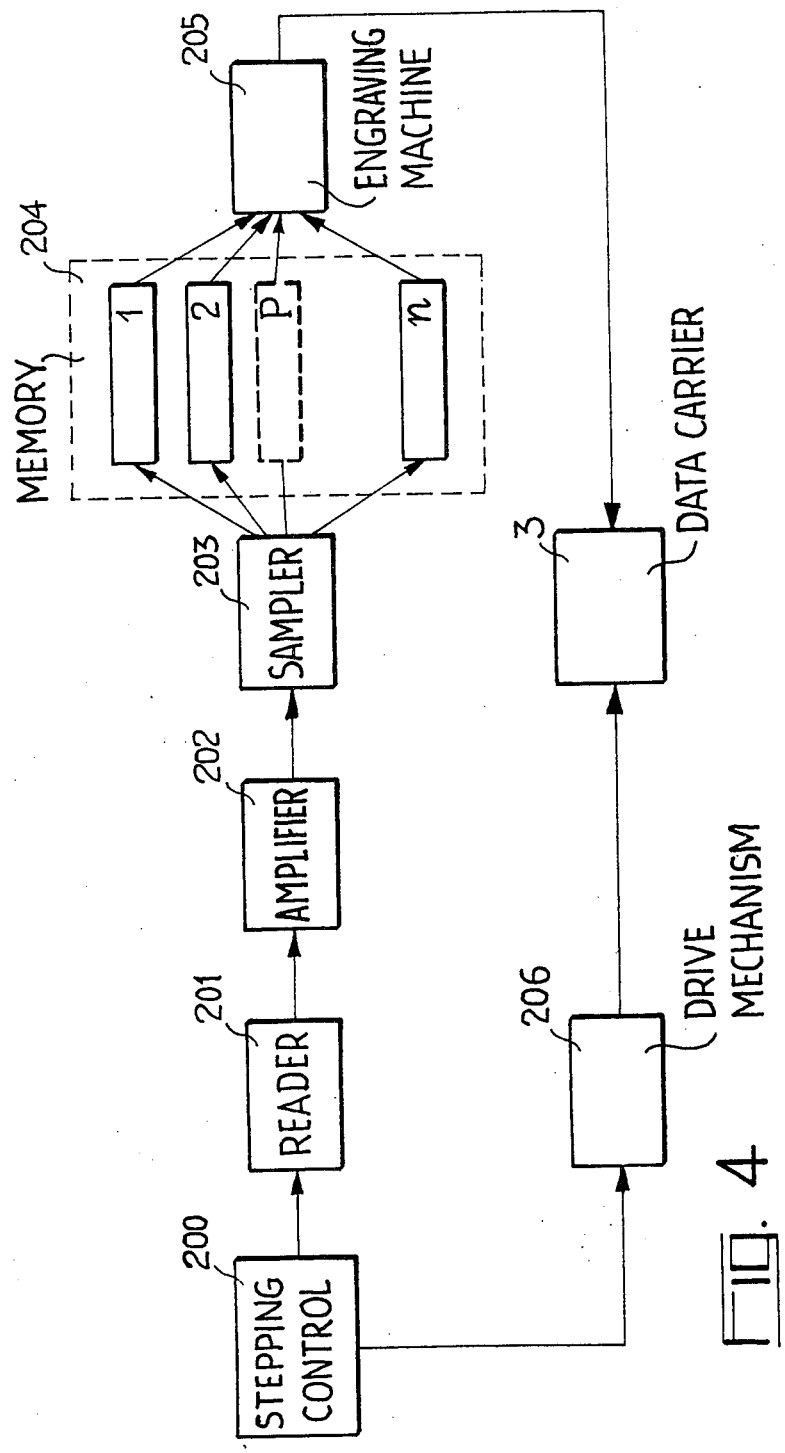
FIG. 4 illustrates a block diagram of a device in accordance with the invention which likewise enables recording to be carried out.

FIG. 4 shows a block diagram of a device in accordance with the invention, which likewise makes it possible to record on one and the same track of a data-carrier, one or more signals by the recording method of the invention as described in FIG. 2. This method employs processing of the signal by a data-processing machine controlling an engraving machine.

The object of this device is to directly transcribe, in the form of variations in the relief of the carrier which are obtained by means of an engraving machine, the set of fringes constituting the recording of the signal, whilst giving each of these fringes a profile such that at the time of their read-out, the energy diffracted by each elementary grating is concentrated in a single diffracted beam, for example, considering FIG. 2, the beam whose phase centre is the point 11. This kind of profile can easily be computed by methods identical to those utilised for the gratings of "blaze" operated spectroscopes.

The engraving of the fringes is effected in a discrete manner, the track being divided, in the direction of translation, into a succession of elementary gratings whose width $a$ is small compared with the width $b$ of the track, and which are engraved successively. The maximum amplitude of the signal is quantised into a large number $n$ of elementary levels $d1$. For a signal whose instantaneous amplitude ranges between the levels $(p-1)$ $dA$ and $pdA$, the law $p$ of the spacing of the fringes of the corresponding elementary network, will be computed so that the elongation $e_p$ of the phase centre of the diffracted wave, from a position $e_o$ corresponding to an instantaneous amplitude of zero, has the value $p \cdot de$. This spacing law is readily computed, being in fact that of the interference fringes given by two spherical waves the positions of which phase centres are known. For each value $p$, an engraving program is calculed, fixing the spacing and profile of the successive grooves of the elementary network which the machine will have to engrave.

The device shown in FIG. 4 thus embodies a stepping control 200 acting simultaneously on the reader 201 and the drive mechanism 206 of the data-carrier 3 which is to be engraved. The signal previously recorded by a conventional method, is read by the reader 201 and amplified by the d.c. amplifier 202 and sampled by the sampler 203 which controls the access to the memory 204 of a data-processing machine; this memory contains the $n$ engraving programs corresponding to the $n$ sampled values of the signal. For each step made by the carrier, the sampler selects in the data-processing machine, commencing from the corresponding value of the signal read by the reader, a programme number $p$ which is transmitted to the engraving machine 204. When the elementary grating has been engraved over the whole of the length $b$, the carrier advances a distance $a$, the reader advances a corresponding distance, and the process is repeated.

The device in accordance with the invention likewise makes it possible to engrave several signals on one and the same track. With each step, each of the signals is read out and successively engraved on the elementary network before passing to the next step.

This device has the advantage, compared with the optical device shown in FIG. 3, that it produces a recording which has a better luminous efficiency. Furthermore, in particular where sound recording is concerned, it enables the signal to be processed in such a fashion as to correct the imperfections of the recording and read-out systems.

FIG. 5 illustrates an example of the device in accordance with the invention, which enables the read-out of a signal recorded on a track of a carrier in order to form the recording described in FIG. 2. This non-limitative example relates to the case in which the recording method uses amplitude or phasemodulation of the reflected wave.

The device comprises a substantially punctiform and substantially monochromatic light source 100, and a lens 210 forming the image of said source at the point 10, after reflection at the flat mirror 711. The divergent beam issuing from the phase centre 10 constitutes the reference beam and illuminates the data-carrier 3; the latter is a reflective disc rotating at uniform velocity about its axis 30 and carrying, recorded on a track 40 of width $b$ the signal which is to be read-out, which signal has been recorded by the method of the invention as described in FIG. 2. Between the source iou and the lens 210, there is a rectangular diaphragm 710 including an elongated slit; this slit is arranged so that its image 810, produced by the lens 210, is formed in the plane of the carrier 3, the large side $b$ of said image covering the width of the track and being disposed perpendicularly to the direction of displacement.

In accordance with the profile given to the recorded fringes, the reference beam is diffracted by the elementary grating of contour 810, to form one or more beams. In the figure, only the beam of highest intensity has been illustrated; this converging at its phase centre 11. When the carrier is moving, the point 11 oscillates along a straight line D perpendicular to the direction of displacement of the carrier. The figure illustrates the particular case in which the recorded fringes constitute a Fourier hologram; the straight line D is then located in a plane parallel to the carrier and passing through the phase centre 10 of the reference wave.

The point 11 displaces on a plate 111 of variable transparency whose transmissivity varies linearly in the direction perpendicular to the direction of displacement, in other words along the straight line D. It is important to observe that the luminous intensity of the point 11 remains constant whatever its position; the intensity of the diffracted beam, after passing through the plate; thus depends purely upon the position of the point on said plate; consequently, this plate converts the displacement of the phase centre into proportional variation of the transmitted luminous intensity. A lens 410 forms the image of the contour 810, after reflection at the flat mirror 712, on the sensitive surface of a photomultiplier 910 which converts the variations in illumination into variations of voltage; this arrangement makes it possible to permanently use the same part of the sensitive surface, eliminating errors due to local fluctuations in the sensitivity of said surface.

The whole of the optical system for forming the reference beam and reading the diffracted beam, is carried by moving arm 800 having a translatory motion passing through the centre of the disc. A screw drive, not shown in the figure, synchronised with the drive motion of the carrier, enables the trace 810 of the reference beam on the carrier to follow the recording track 40 at all times, a marker on the disc indicates the position which the latter should have in order to achieve initial superimposition of the trace 810 of the track.

When the width $a$ of the intersection 810 of the reference beam becomes very small in relation to the width $b$ of the recording track, the point of focus 11 of the diffracted wave spreads in the direction of displacement of the carrier; this phenomenon has no drawback since the straight lines of equal transparency of the variable-transmissivity plane, are disposed parallel to the direction of said broadening.

If several signals have been recorded on the same track, the elementary diffractive network delimited by the contour 810, will give rise to as many diffracted beams, as there are recorded signals one of these diffracted beams being the diffracted beam converging at the point 11. Thus, to each beam it will correspond a different read-out channel comprising a photomultiplier, a mirror and a lens, and, possibly, a variable-transparency plate.

The inaccuracies in the positioning of the disc, poor centring or focussing, may unduly affect the position of the diffracted beam and thus disturb the reconstitution of the signal. Arrangement of the fringes in accordance with a Fourier hologram is particularly important in so far as it makes it possible to reconstitute the signal undisturbed by such positional inaccuracies. As explained earlier, the position of the phase centre 11 of the diffracted wave then becomes independent of the position of the carrier; moreover, translational movements of the carrier in its own plane do not affect the position of this point; furthermore; if the procedure adopted is such that the axes of the various diffracted beams corresponding to the different recorded signals, are located in a plane perpendicular to the carrier and parallel to the direction of displacement, the shift to the point 11 due to a translation of the carrier parallel to its own axis, will likewise be parallel to the direction of displacement and therefore parallel to the lines of equal transmissivity of the plane 111. If the recorded signal is a single one, then the procedure will be that the axis of the diffracted beam utilised for read-out is perpendicular to the carrier, as indicated in FIG. 5.

The case in which the data-carrier is a transparent one and not a reflective one, creates no particular difficulty as far as read-out is concerned, compared with the case described. In this situation, one of the optical arrangements schematically described in FIG. 1b or FIG. 1c will be used, where the reference channel and the read-out channel are located at either side of the disc; the moving arm will be terminated in a U formation whose two legs are parallel to the disc, the one carrying the optical system for the reference beam and the other that for the read-out beam.

It will be observed, too, that the variable-transparency plate, provided that it has a sufficient area, can be arranged at an arbitrary section of the diffracted beam, thus making it possible in some cases to simplify assembly and economise on one lens.

If the recording carrier is a tape or film, the read-out head 800 will be stationary.

What I claim is:

1. Record readable by means of a monochromatic beam of radiant energy and storing on a data carrier $p$ signals within a single track of constant width, $p$ being an integer at least equal to unity;

said signals exhibiting variations in instantaneous amplitude;

said data carrier having a non uniform optical characteristic, said characteristic defining fringes within said track, said fringes being directed along the axis of said track and forming $p$ superimposed sets; and at least one of said fringes being continuous along said track;

each said set of fringes being respectively associated with each said signal and obeying a distinctive law of spacing along a direction perpendicular to the axis of said track, said law being variable along said axis and transcribing in said track said instantaneous amplitude;

said law of spacing being that of a set of interference fringes produced by two monochromatic light point sources arranged on a straight line parallel to the plane of said data carrier and perpendicular to the axis of said track; one of said point sources being fixed and the other vibrating along said straight line with an elongation proportional to said instantaneous amplitude.

2. Record as claimed in claim 1, wherein said data carrier has a non uniform transparency, said non uniform transparency being said non uniform optical characteristic.

3. Record as claimed in claim 1, wherein said data carrier has a non uniform reflectivity, said non uniform reflectivity being said non uniform optical characteristic.

4. Record as claimed in claim 1, wherein said data carrier has two faces; one at least of said faces carrying a reflective relief having a non uniform wavy profile; and wavy profile being said non uniform optical characteristic.

5. Record as claimed in claim 1, wherein said data carrier is transparent and presents a non uniform thickness; said non uniform thickness being said non uniform optical characteristic.

6. Record as claimed in claim 1, wherein said data carrier is transparent and presents a non uniform refractive index, said non uniform refractive index being said non uniform optical characteristic.

7. Record as claimed in claim 1, wherein said data carrier takes the shape of a disk, said disk having two parallel faces and a rotation centre; at least one track being inscribed on at least one said face and along a constant-pitch spiral; said signals being stored along said track.

8. Record as claimed in claim 1, wherein said data carrier has two faces, at least one transparent layer and one flat mirror; said layer underlying said face and said mirror underlying said layer.

9. Record as claimed in claim 8, wherein said non uniform optical characteristic is the non uniform thickness of said layer.

10. Record as claimed in claim 8, wherein said non uniform optical characteristic is the non uniform refractive index of said layer.

11. Record as claimed in claim 8, wherein said non uniform optical characteristic is the non uniform transparency of said layer.

12. Holographic recorder for recording a record readable by means of a monochromatic beam of radiant energy and storing on a data carrier $p$ signals within a single track of constant width, $p$ being an integer at least equal to unity;

said signals exhibiting variations in instantaneous amplitude;

said data carrier having a non uniform optical characteristic, said characteristic defining fringes within said track, said fringes being diected along the axis of said track and forming $p$ superimposed sets; and at least one of said fringes being continuous along said track;

each said set of fringes being respectively associated with each said signal and obeying a distinctive law of spacing along a direction perpendicular to the axis of said track, said law being variable along said axis and transcribing in said track said instantaneous amplitude;

each said set of fringes, upon illumination of said track by said monochromatic beam, reconstructing a diffracted spherical wave having a phase centre; said phase centre describing a straight line under the displacement of said track; the position of said phase centre along said straight line being representative of said instantaneous amplitude of said signal, said holographic recorder comprising:

means for providing a continuous displacement of said data carrier;

a radiation source;

optical means for forming from said source a spherical carrier wave and $p$ spherical object waves;

and optical-mechanical means for deflecting respectively said $p$spherical object waves; said optical-mechanical means being controlled by aid $p$ signals; the centres of said waves respectively describing $p$ straight lines perpendicular to said displacement, the abscisse of each said centre on each said line being respectively proportional to the instantaneous amplitude of said $p$ signals;

means for providing a rectangular interference zone located in aid data carrier, said rectangular zone being very narrow in the direction of said displacement.

13. Holographic recorder as claimed in claim 12, wherein a single plane, parallel to said recording medium, contains the centres of said carrier and object waves.

14. Holographic recorder as claimed in claim 12, wherein said radiation source is a coherent radiation source.

15. Optical reader for reading out a record readable by means of a monochromatic beam of radiant energy and storing on a data carrier $p$ signals within a single track of constant width, $p$ being an integer at least equal to unity;

said signals exhibiting variations in instantaneous amplitude;

said data carrier having a non uniform optical characteristic, said characteristic defining fringes within said track said fringes being directed along the axis of said track and forming $p$superimposed sets; and at least one of said fringes being continuous along said track;

each said set of fringes being respectively associated with each said signal and obeying a distinctive law of spacing along a direction perpendicular to the axis of said track, said law being variable along said axis and transcribing in said track said instantaneous amplitude;

each said set of fringes, upon illumination of said track by said monochromatic beam, reconstructing a diffracted spherical wave having a phase centre; said phase centre describing a straight line under the displacement of said track; the position of said phase centre along said straight line being representative of said instantaneous amplitude of said signal, said reader comprising:

means for communicating a motion to said data carrier;

a quasi-punctiform quasi-monochromatic light source;

optical means for forming from said source said monochromatic beam $p$ read-out channels, each channel including a linearly variable transparency plate and photodetector means;

said monochromatic beam illuminating said track for providing $p$ said diffracted spherical waves respectively travelling through said optical channels, said photodetector means being positioned at the end of said channels for collecting said diffracted spherical waves, said plates intercepting said diffracted spherical waves between said track and said photodetector means.

* * * * *